Dec. 2, 1969    J. D. HOWELL    3,481,215
HELICAL GEARING

Filed March 25, 1968    4 Sheets-Sheet 1

INVENTOR:
JOHN D. HOWELL
BY Bradley Cohn
ATTORNEY

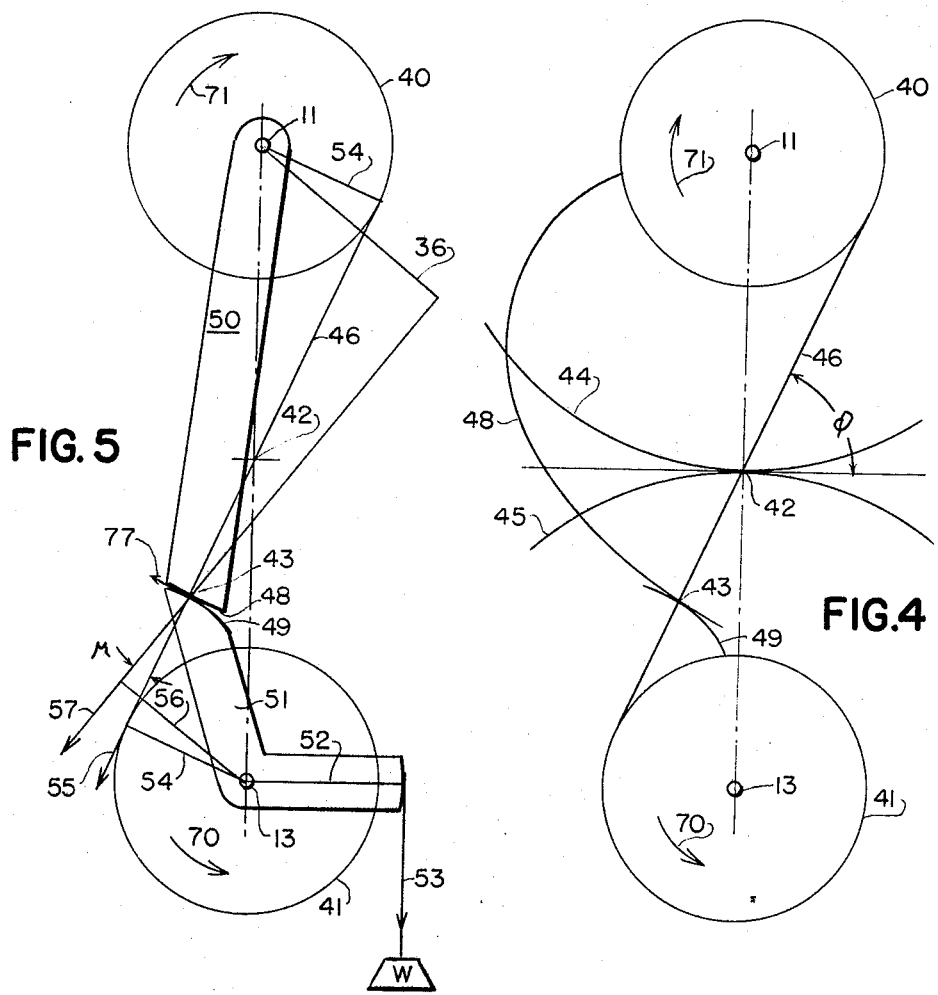

Dec. 2, 1969 J. D. HOWELL 3,481,215
HELICAL GEARING
Filed March 25, 1968 4 Sheets-Sheet 3

INVENTOR:
JOHN D. HOWELL
BY
ATTORNEY

Dec. 2, 1969     J. D. HOWELL     3,481,215
HELICAL GEARING

Filed March 25, 1968     4 Sheets-Sheet 4

*INVENTOR.*
JOHN D. HOWELL

BY *[signature]*
ATTORNEY

United States Patent Office 3,481,215
Patented Dec. 2, 1969

3,481,215
HELICAL GEARING
John D. Howell, 140 Red Hill Road,
New City, N.Y. 10956
Filed Mar. 25, 1968, Ser. No. 715,753
Int. Cl. F16h 55/04
U.S. Cl. 74—424.5           8 Claims

ABSTRACT OF THE DISCLOSURE

Involute spur gear tooth profiles are developed far beyond their normal range and then formed into helical gears to provide self-locking gears with parallel shafts and a wide range of gear ratios.

BACKGROUND OF THE INVENTION

Self-locking gears have a large number of applications and are well known. For example, a common worm and worm wheel is self-locking in that the worm wheel cannot turn the worm when the coefficient of friction is equal to or greater than the tangent of the worm thread angle. However, a worm and a worm wheel must have a low gear ratio in that many turns of the worm are required to turn the worm wheel once. In addition, self-locking worms and worm wheels have very low efficiencies. This invention provides a self-locking gears which may have ratios even higher than one to one over a wide range. This invention also provides self-locking gears on parallel shafts with the gears having a high efficiency.

U.S. Patent No. 2,973,660 to J. B. Popper shows self-locking gearing, however his gearing cannot have its shafts parallel which prevents Popper from using double helical gears. Thus the gears of Popper must operate with very great end thrust.

Roano in his U.S. Patent No. 1,772,688 shows gears superficially similar to those of this invention; however, he teaches on his page 4, lines 63–94, that the profiles of his gear teeth are trapezoidal and do not possess the characteristics of common gearings. An important aspect of the instant invention is that it provides self-locking gears with tooth profiles which possess all the characteristics of common gearings. In Roano's U.S. Patent 2,553,383, in column 8, lines 69 and 70, and in his U.S. Patent No. 2,553,384, in column 1, lines 21 and 22, he states that a section through his gear teeth would show them to be trapezoidal. The instant invention provides gearing which is self-locking in the same manner as that described by Popper and Roano, but the gears of the instant invention have involute tooth profiles as do conventional gears with the involute curves merely being extended beyond their usual limits.

SUMMARY OF THE INVENTION

Involute line contact spur gear tooth profiles are extended beyond their normal ranges and formed as all addendum tooth surfaces on a drive pinion and as all dedendum tooth surfaces on a driven gear. To maintain a contact ratio greater than one, the tooth profiles must be formed as helicoids. The selection of suitable tooth profiles allows a pinion to drive a gear with high efficiency in either direction; however, should the gear tend to drive the pinion, the combination may be designed so that the combination will lock. If simple locking is not desired, the tooth profiles may be selected so that the gear may drive the pinion with low efficiency or so that the gear, on attempting to drive the pinion, will lock the gear pair until the gear itself is unloaded and reversed before the pinion can again drive the gear in the original direction. This last circumstance is defined as second order self-locking by Popper in his U.S. Patent 2,973,660 in column 7, lines 37–75.

Thus the gearing of this invention provides self-locking helical gears on parallel shafts with any desired gear ratio, the gearing operating with high efficiency and with the desirable wear and contact characteristics of conventional involute gear teeth. While the gears of this invention could be made with other conventional tooth profiles, such as the older cycloidal gear teeth, the advantages resulting from using involute tooth profiles in this invention parallel those which result from using involute gear teeth in standard practice.

The gearing of this invention has many uses. For example, on simple automobile window raising mechanisms it is desirable to have the crank handle raise the window through a fairly high gear ratio; however, force on the window should not be able to turn the handle. By driving through a simple gear pair according to this invention, the handle may raise and lower a car window which will remain in any desired position. This invention may also be used in steering mechanisms for vehicles where the wheels are positioned by an operator turning a steering wheel but road shocks should not be transmitted to the steering wheel from the wheels. Uses may also be found for a second order self-locking gear train according to this invention in the drive train to position a servomechanism. Such a drive train would completely prevent overshoot of the servo output so that the servo would have almost perfect damping characteristics. An almost endless variety of other uses for the gears of this invention may be found.

BRIEF DESCRIPTION OF THE DRAWING

FIGURE 4 is a diagram showing the theory of involute gear teeth according to this invention;
FIGURE 5 is an end view of a pair of rotatably mounted arms having end surfaces formed thereon conforming to the gear tooth profiles of this invention with force diagrams showing normal driving conditions;
FIGURE 6 is an end view of an arm of FIGURE 5 showing the gear tooth profile surface thereon;
FIGURE 7 is an end view of the arm of FIGURE 6 distorted to form a helical gear tooth surface according to this invention;
FIGURE 8 is a top view of the arm of FIGURE 6 longitudinally sliced and fanned out to form an approximation of a helical gear tooth surface according to this invention.

DESCRIPTION OF THE PREFERRED EMBODIMENT

Figures 1, 2:
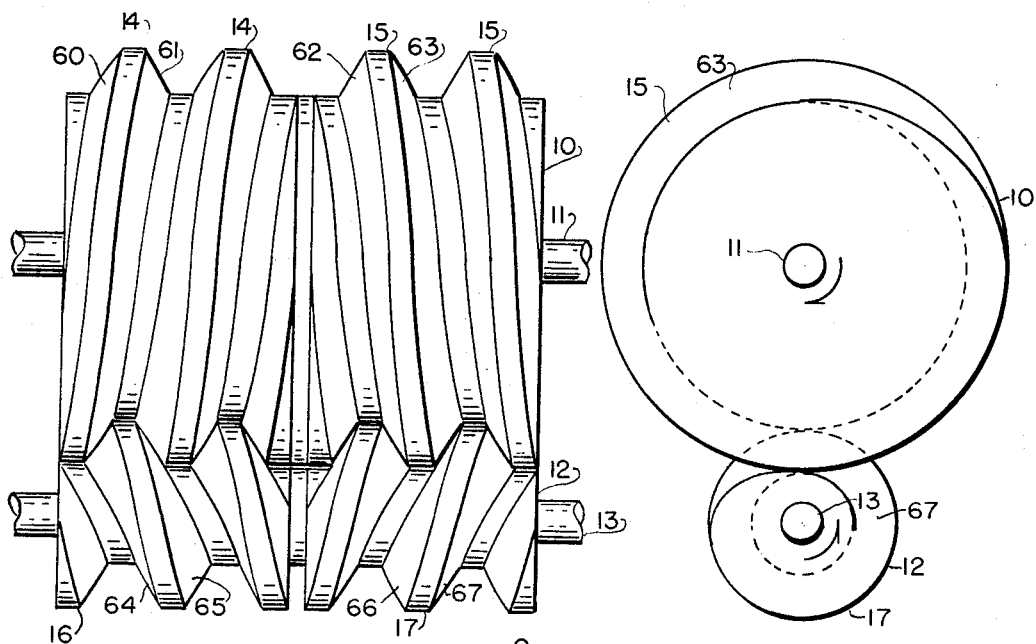
FIGURE 1 is a side view of a meshing pinion and driven gear according to this invention.
FIGURE 2 is an end view of the gears of FIGURE 1.

FIGURES 1 and 2 show a pinion 10 mounted on a shaft 11 which drives a gear 12 on a parallel shaft 13 with a gear ratio of one to one. Pinion 10 has helical teeth 14 and 15 on it to form a double helical gear and gear 12 has helical teeth 16 and 17 formed thereon to be engaged by the teeth 14 and 15.

Figure 3:
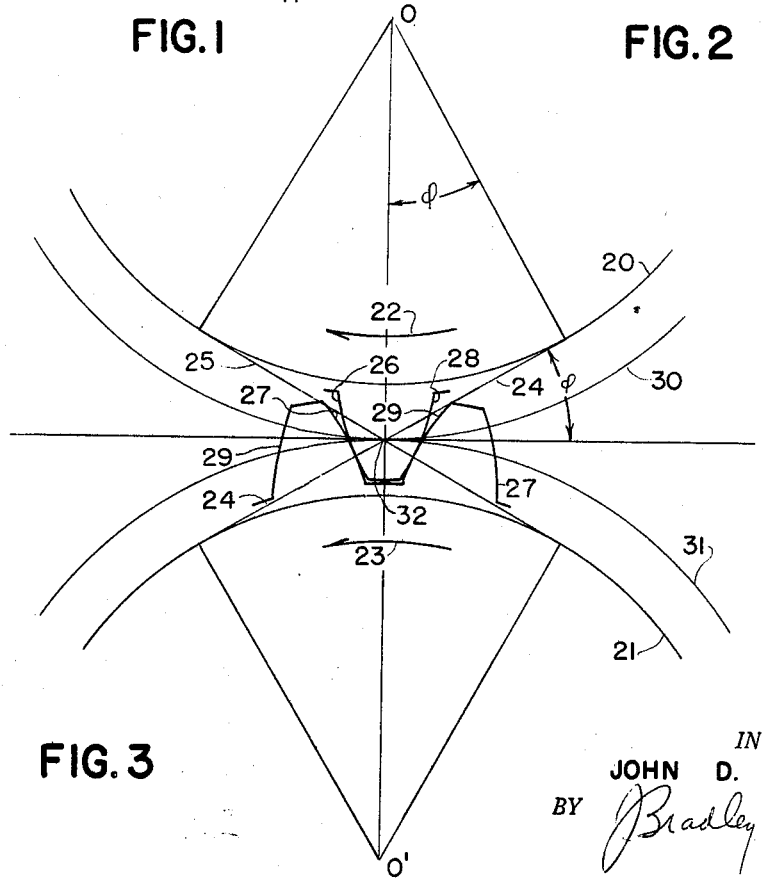
FIGURE 3 is a diagram showing the theory of conventional spur gear involute gear teeth.

To understand the generation and profiles of the gear tooth shapes of FIGURES 1 and 2, elementary conventional gear tooth theory will be restated. Referring now to FIGURE 3, about the centers O and O' are drawn a pinion base circle 20 and a driven gear base circle 21. Tangents 24 and 25 connect the base circles 20 and 21 and, in accordance with conventional involute gear tooth profile theory for spur gears, these tangents 24 and 25 are the lines of action or loci of contact points between driving and driven involute gear tooth surfaces. The angle $\varphi$ between these tangents and a normal to the line of centers is known as the pressure angle. Thus the gear tooth surfaces 26 would contact gear tooth surfaces 27 on the tangent 24 and both said surfaces 26 and 27 would be normal to said tangent 24 as the hypothetical pinion drove a gear in the direction indicated by the arrows 22 and 23. The tangent 25 indicates the locus of the points of contact of gear tooth surfaces 28 with the surfaces 29 if the pinion drove the gear in the opposite direction to that indicated by the arrows 22 and 23.

As is well known, involute gear teeth enjoy many advantages. They provide line contact as the meshed gears turn with constant angular velocities. Involute teeth continue to function correctly with variation in gear center distance with only a variation in backlash. The tooth surfaces of involute gear teeth have superior wear characteristics and the tooth profiles are easily calculated and generated.

Referring further to FIGURE 3, as the pinion drives the gear, the pitch circle 30 of the pinion will roll on the pitch circle 31 of the gear at point 32, the pitch point. As is further well known in involute gear tooth theory, pinion tooth surfaces 26 and 28 may be formed and used entirely outside the pitch circle 30 to engage driven gear tooth surfaces 27 and 29 entirely inside or within pitch circle 31. A pinion having all addendum driving tooth surfaces and a meshing driven gear having all dedenum driven gear tooth surfaces is known.

FIGURE 4 is a diagram showing how the tooth profiles of the gears of this invention are generated using the conventional spur gear theory hereinbefore described. Base circles 40 and 41 of the pinion 10 and the driven gear 12 are shown drawn about shafts 11 and 13. Pitch circles 44 and 45 contacting at pitch point 42 are also shown drawn about the shafts 11 and 13. The base circles 41 and 42 are of the same diameter so that the pinion 10 and the driven gear 12 would have a gear ratio of one to one and the pitch circles 44 and 45 will have equal radii. Furthermore, the base circles 40 and 41 are small in comparison to the center distance between shafts 11 and 13 thus giving a much higher pressure angle $\varphi$ than normally used in gearing. Tangent 46 represents a theoretically possible line of action of driving and driven involute gear teeth formed to rotate about the shafts 11 and 13. The pinion tooth profile represented by the involute curve 48 extends well beyond the pitch circle 44 and the driven gear tooth profile represented by the shorter involute curve 49 ends well within the pitch circle 45. Thus rotation of a pinion 10 with a tooth surface 48 in the direction of the arrow 71 would drive a driven gear with a contacted tooth surface 49 in the direction of arrow 70. The point of contact would move downward along tangent 46.

FIGURE 5 shows such tooth profiles 48 and 49 formed on arms 50 and 51 which are mounted to rotate about the shafts 11 and 13. Arm 51 is also shown acted on by a moment $53 \times 52$ produced by a weight W represented by force vector 53 acting on the moment arm 52. It is to be noted that tooth surface 48 is all addendum and tooth surface 49 is all dedendum; that is, both surfaces are entirely between the pitch point 42 and the lower shaft 13. If arm 50 is rotated in the direction shown by arrow 71, its surface 48 will slide in contact at 43 wtih surface 49 of arm 51 with a velocity relative to 49 in the same direction as its absolute velocity; that is 49 will lag behind 48, though arm 50 drives arm 51 with the same angular speed. Thus arm 50 may act, though through a small angle, to drive arm 51 as a gear against the load moment $53 \times 52$.

If there were no friction, the driving force of 48 on 49 would be along their common normal, the line of action 46, as shown by vector 55 and the moment arm of this force would be the radius 54 of the base circle 41, giving a moment $55 \times 54$ equal to the load moment $53 \times 52$. If there is friction, sliding of 48 on 49 will produce a force vector 77 tangent to 48 and 49 tending to reesist the lagging of 49 behind 48 and swinging the resultant force vector outward from center 13 through an angle $\mu$, the angle whose tangent is the coefficient of friction, as shown by vector 57, giving an increased moment arm 56 about shaft 13. Consequently, since moment $57 \times 56$ must equal the load moment $53 \times 52$, force vector 57 will be less than force vector 55. Force vector 57 also has a moment arm 36 about shaft 11, giving a driving moment $57 \times 36$. As the forces and angular motions are the same for the two shafts, the efficiency of the drive will be 100% times the ratio of moment arms; that is, $$e = 100\% \times \frac{56}{36}$$

Further, as the point of contact 43 approaches the pitch point 42 along 46, 56 increases and 36 decreases, approaching equality, so that the efficiency can approach 100%, though 43 cannot reach 42 if the objects of this invention are to be attained.

Referring now to FIGURE 10, if, again, there were no friction, and the driving torque on arm 50 were reduced below that needed to overcome the load moment $53 \times 52$ on arm 51, arm 51 would drive arm 50 in the opposite direction, as shown by arrow 75. In this case, however, surface 49, now the driver, will have a velocity relative to 48 in the opposite direction to its absolute velocity; that is, it must make 48 move faster than itself. Without friction, of course, this would make no difference, and the driving force 55 of 49 on 48 would again lie along the line of action 46 with its moment arm again the radius of the base circle. With friction, however, the friction vector 78 would be in a direction to resist the advancing motion of 48 with respect to 49 and cause the direction of the force vector, such as 59, to swing in toward center 11 as the driving torque on arm 50 is reduced. If, in swinging from the line of action 46 toward the center 11, the angle of swing exceeds the friction angle $\mu$, in short, if $\mu <$ angle A, 48 will slide ahead of 49 and 51 will drive 50. In this case, vector 59 has a moment arm 68 about center 13 so that its moment $59 \times 68$ equals the load moment $53 \times 52$. About 11, however, it has a smaller moment arm 58, so that the driving torque $59 \times 58$ may be smaller in this proportion to prevent the driving of 50 by 51 due to the load moment $53 \times 52$. Nevertheless, as long as $\mu <$ angle A so that a moment arm 58 exists, a driving torque less than $59 \times 58$ will permit arm 51 to drive 50.

Figure 11:
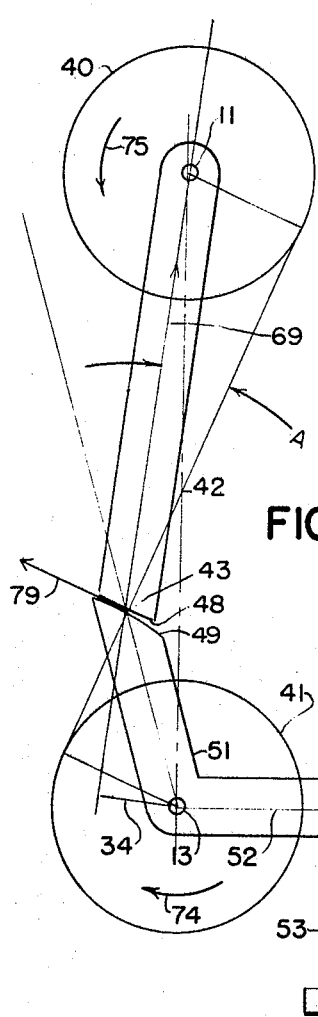
FIGURE 11 shows arms similar to those shown in FIGURE 5 with force diagrams indicating a condition of arms, or gears which they represent, locked against reverse driving.

Proceeding to FIGURE 11, if, in swinging away from the line of action 46, the direction of the force vector of 49 on 48 due to the load moment passes through center 11, as shown by vector 69, without exceeding the friction angle $\mu$ in its angle of swing, its moment arm and with it its moment about 11 vanishes and there can be no sliding, nor can 51 drive 50 even though the driving torque on 50 is reduced to zero. The system is then said to be locked.

Figure 12:
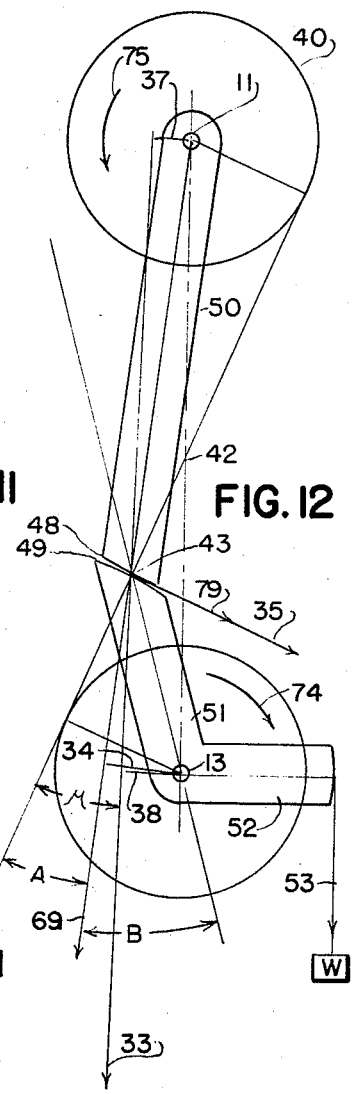
FIGURE 12 shows arms similar to those shown in FIGURE 5 with force diagrams indicating the conditions permitting a locked driven arm, or gear which it represents, to turn in the direction of loading.

Going on to FIGURE 12, if a reverse driving moment, that is, in the direction of arrow 75, is applied to arm 50, the force vector of 48 on 49, such as 33, will swing further in toward center 13. (Note that in this figure, as in FIGURE 5, the force vectors shown are those of 48 on 49, while in FIGURES 10 and 11 they are those of 49 on 48, and hence reversed in direction.) Again, if the angle of swing exceeds the friction angle $\mu$ without the force vector 33 passing through center 13, that is, if $A < \mu < (A+B)$, there will be a moment arm 38 and a moment 33×38 equal to and balancing the load moment 53×32. This will permit the tangential friction force to increase from 79 to that necessary for sliding, 35, since 35≧33 tan $\mu$. The force 33 will also have a moment arm 37 about 11. Thus, application of a moment 33×37 on 50 in the direction of arrow 75 is necessary to permit the load moment 53×52 to turn 51 about 13 in the direction of arrow 74. Further, if the friction angle $\mu$ is so large that the vector 33 passes through 13 before its angle of swing exceeds $\mu$, that is, $\mu \geq (A+B)$, the moment arm 38 vanishes. Since the moment 33×38 must equal 53×32, force vector 33 and tangential vector 35 increase without limit without sliding and no moment 33×37 exists that will cause 50 to drive 51 even though the load force 53 is reduced to zero. This condition is known as second order self locking, and a moment counter to and exceeding the load moment 53×52 must be applied to arm 51 to release it.

It may be noted here that if $\mu + \varphi = \pi/2$ (or 90° in degree measure), the direction of vector 33 will be parallel to the line of centers of 11 and 13, and the point of contact 43 can approach the pitch point 42 quite closely without the vector passing through either axis center. However, as 43 approaches 42, the angle B shrinks and approaches zero, and unfortunately the angle $\mu$ is subject to considerable variation in practice, so that the approach of 43 to 42 is limited where normal locking is desired and second order locking is to be avoided.

From the foregoing it will be apparent that a spur pinion and a spur gear having gear faces 48 and 49 as shown in FIGURE 5 would have a contact ratio far less than one and so could only drive through a very small angular displacement. However, as shown in FIGURE 8, a spur gear could be made according to this invention by mounting many arms 51 on a shaft 13 with each arm 51 displaced a few degrees from the other. Thus an axially displaced number of fanned out arms 51 could be successively contacted and driven by a corresponding number of fanned out arms 50 (not shown). If the arms 50 and 51 were fanned out through 360 degrees and faced in both directions, a complete pinion and gear would result according to this invention. However, this form of my invention would be difficult to construct and impractical.

FIGURE 6 is an end view of arm 50 having tooth surface 48 formed thereon. FIGURE 7 shows arm 50 and surface 48 distorted to form a helical tooth surface 48' wrapped about axle 11 with a base helix angle $\mu$, the base helix angle $\psi$ of a spur gear being zero. For any section of this tooth surface taken normal to the axis 11 to be involute, the helical surface will be an involute helicoid, the surface generated by a straight line moving tangent to a helix on the base cylinder. As may be seen in FIGURE 1, the tooth surfaces 60–67 of the teeth 14–17 are formed in this manner. The tooth surfaces 60–67 extend at least once about the shafts 11 or 13 so that the contact ratio between the pinion 10 and the gear 12 is at least one. Double helical gears 10 and 12 are used to remove all end thrust from shafts 11 and 13.

Figure 10:
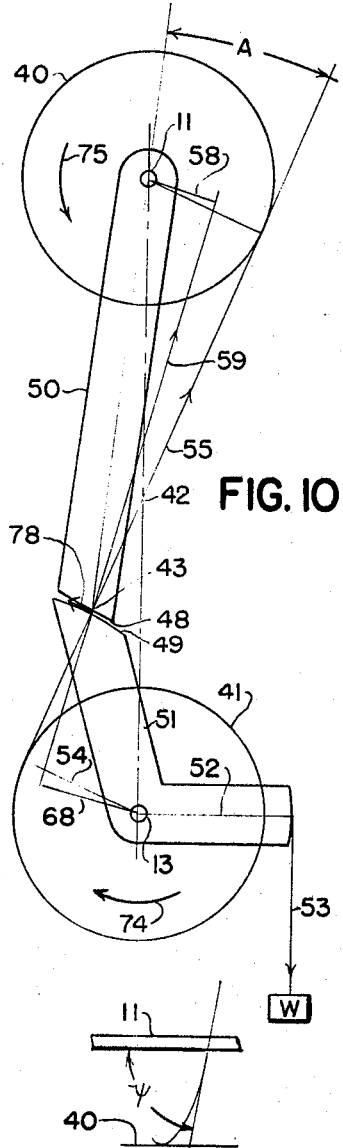
FIGURE 10 shows arms similar to those shown in FIGURE 5 with force diagrams indicating a reversed driving condition with low friction.
Figure 9:
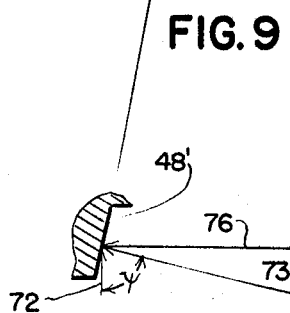
FIGURE 9 is a force vector diagram showing the effect of the base helix angle of a helical gear on the virtual coefficient of friction as applied to the gear tooth surfaces of this invention.
Figure 13:
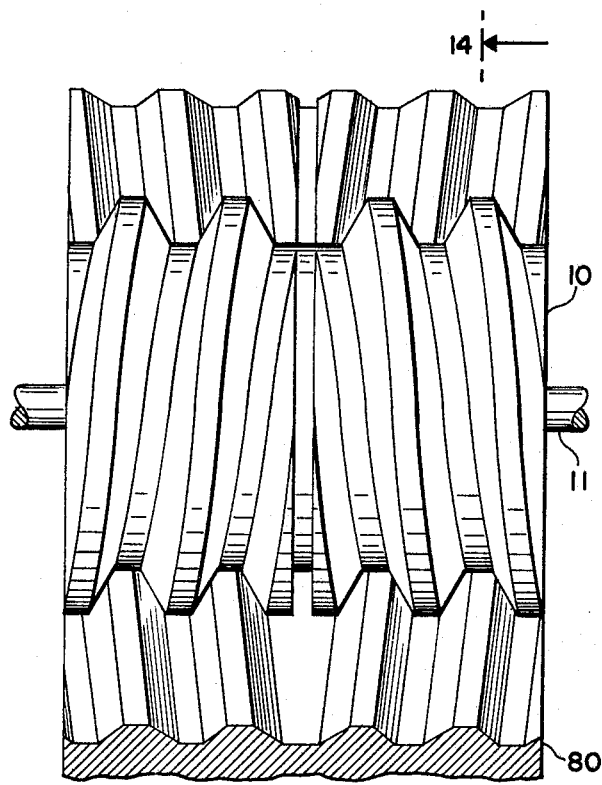
FIGURE 13 is a top view of a meshing pinion and a fragment of a rack gear.
Figure 14:
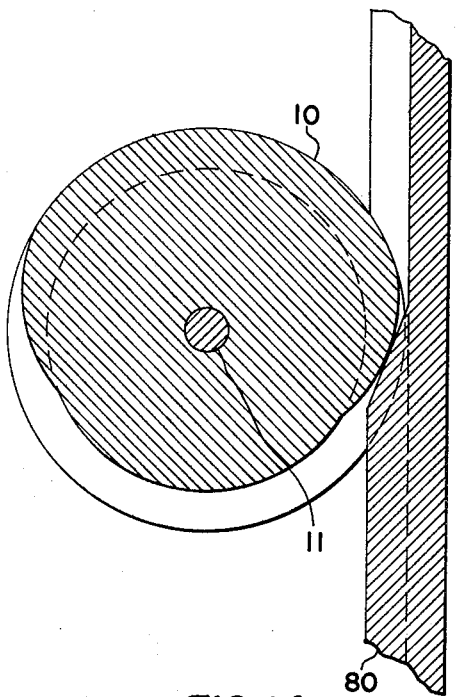
FIGURE 14 is a section taken on line 14—14 of FIGURE 13.
Figure 15:
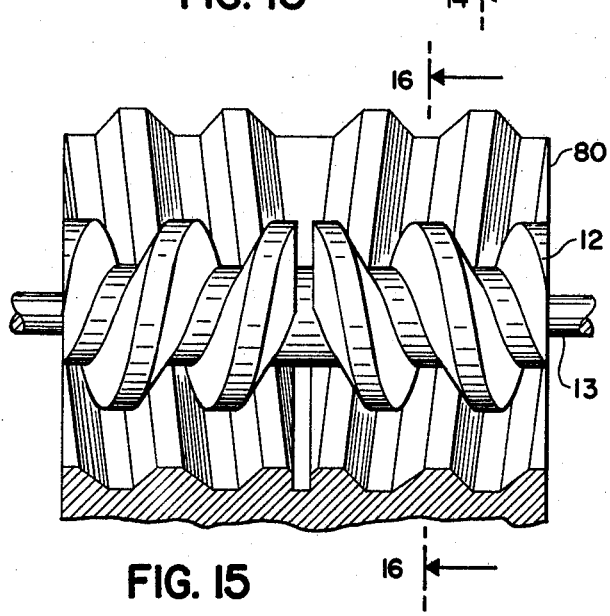
FIGURE 15 is a top view of a meshing gear and a fragment of a rack.
Figure 16:
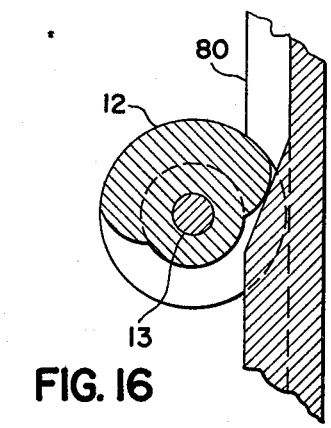
FIGURE 16 is a section taken on line 16—16 of FIGURE 15.

As shown in FIGURE 9, which is a section through 48' in the plane whose projection is line of action 46 in FIGURE 10, if the force due to the load there represented by vector 55, is here represented by vector 72, it will produce an axial force 76, with a force resultant 73 normal to tooth surface 48' equal to vector 72 times the secant of the base helix angle $\psi$. It is this normal force resultant 73 that produces the friction force resisting sliding, shown as vector 78 in FIGURE 10 but in FIGURE 9 normal to the paper and hence not shown. Its value would be the product of vector 73 and the coefficient of friction, or $$78 = 73 \times f = 72 \times f \times sec\ \psi$$

However, to avoid calculating force 73 and to keep calculations and graphics in the plane normal to the axes, it is customary to combine the last two factors into an apparent coefficient of friction, $f_a = f \times sec\ \psi$, or to use an apparent friction angle, $\mu_a = \tan^{-1}(f \times sec\ \psi)$. Thus, while FIGURES 5, 10, 11 and 12 were described as applying to spur type teeth, they apply equally to helical teeth if $\mu$ is replaced by $\mu_a$. As noted above, the axial component 76 may be balanced out by an equal and opposite axial component by providing similar teeth with a helix of the opposite hand.

Though shown in the drawings as with a one to one ratio, the gears of this invention may be in any desired ratio subject to the general restriction on all toothed gearing that the ratio be a rational number; that is, that each gear have a whole number of teeth. Thus the pinion may drive the driven gear faster or slower than itself. Also either driver or driven gear may be made as a rack or an internal gear.

Further, the gears of this invention may be designed to be first or second order self-locking gears on parallel shafts using extensions of well known gear theory such as involute tooth profile gear theory. If pinion 10 and gear 12 are self-locking, pinion 10 may drive gear 12 in either direction but gear 12 will not be able to drive pinion 10. If pinion 10 and gear 12 are second order self-locking, pinion 10 will be able to drive gear 12 in either direction, but if gear 12 attempts to drive pinion 10 the load on gear 12 will have to be relieved before it can again be driven in the same direction by pinion 10. Finally, unlike a self-locking worm and worm wheel, the pinion may drive the gear of this invention with a high efficiency. If the gear teeth 14–17 of pinion 10 and gear 12 have involute gear tooth profiles, they may enjoy all the well known advantages of conventional involute gear teeth.

FIGURES 13–16 show pinion 10 driving a rack 80 and they show rack 80 driving gear 12.

Thus in summation it may be seen that the gears of my invention operate with a high pressure angle which is approximately the complement of the friction angle to provide, when desired, self-locking gears. The pinion or drive gear has all addendum tooth surfaces or tooth surfaces formed outside its pitch circle while the driven gear has all dedendum tooth surfaces formed inside its pitch circle. The use of helical gears reduces the pressure angle as it increases the friction angle. Thus the gears of this invention may be designed so that, when the driven gear tries to drive the pinion, the friction angle throws the force vector past the pinion center to lock the gears from rotation.

It is again to be noted that the concept of this invention is independent of the gear ratios selected and the number of gear teeth on the gears. The system is based on accepted gear principles of gear tooth design through the use of variable parameters outside the range usually used.

While this invention has been shown and described in the best form known, it will nevertheless be understood that this is purely exemplary and that modifications may be made without departing from the spirit and scope of the invention except as it may be more limited in the appended claims.

What is claimed is:
1. A pinion and a driven gear comprising, in combination, a pinion having at least one helical tooth thereon with tooth surfaces of a conventional tooth profile, said pinion tooth surfaces being all addendum tooth surfaces, and a driven gear having at least one helical tooth thereon engaged by the at least one tooth of said pinion, said at least one driven gear helical tooth having tooth surfaces of a conventional tooth profile, said driven gear tooth surfaces being all dedendum tooth surfaces.
2. The combination according to claim 1 wherein the contact ratio between said pinion and said gear is greater than one.
3. The combination according to claim 2 wherein said tooth surfaces of said pinion and said gear are of involute tooth profile.
4. The combination according to claim 3 wherein one of said gears is a rack gear, the at least one helical tooth thereon having a base circle radius of infinite length with each tooth surface being in the form of a diagonal plane.
5. The combination according to claim 3 wherein said pinion and said gear each have at least two helical teeth thereon, said pinion and said driven gear being double helical gears.
6. The combination according to claim 3 wherein said gear may drive said pinion with low efficiency with friction shifting the vector of forces acting on said pinion when being driven by said gear toward the center of said pinion.
7. The combination according to claim 3 wherein said pinion and said gear are self-locking, said gear on attempting to drive said pinion having tooth surface friction shift the vector of forces acting on said pinion at least to the center of said pinion.
8. The combination according to claim 3 wherein said pinion and said gear are second order self-locking, said gear on attempting to drive said pinion having tooth surface friction shifts the vector of forces attempting to drive said pinion so far past the center of said pinion that, before said pinion can again drive said gear in the same direction, the force tending to turn said gear must be relieved.

References Cited

UNITED STATES PATENTS

| | | | |
|---|---|---|---|
| 2,669,128 | 2/1954 | Steiner | 74—458 |
| 2,885,903 | 5/1959 | Parz | 74—458 |
| 3,371,552 | 3/1968 | Soper | 74—462 |
| 3,393,574 | 7/1968 | Roantree | 74—424.7 |
| 3,406,584 | 10/1968 | Roantree | 74—424.8 |

LEONARD H. GERIN, Primary Examiner

U.S. Cl. X.R.

74—458